March 19, 1935.  W. N. GILBERT ET AL  1,994,512
COUNTING SCALE
Filed Aug. 9, 1932
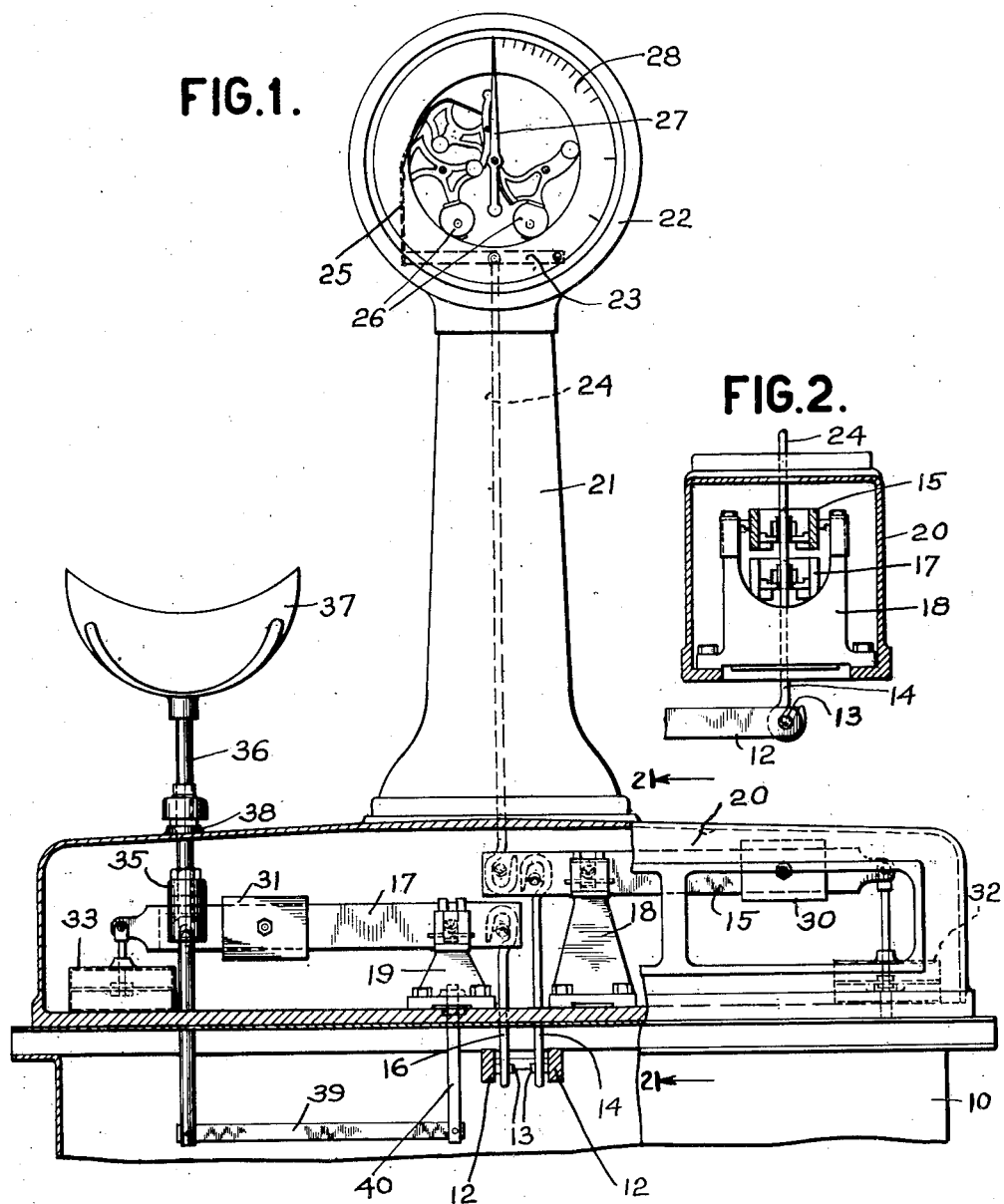
INVENTORS
William N. Gilbert
Clifford B. Haskins
BY
W. M. Wilson
ATTORNEY Patented Mar. 19, 1935

1,994,512

UNITED STATES PATENT OFFICE 1,994,512

COUNTING SCALE

William N. Gilbert, Hudson Heights, N. J., and Clifford B. Haskins, Dayton, Ohio, assignors, by mesne assignments, to International Business Machines Corporation, New York, N. Y., a corporation of New York Application August 9, 1932, Serial No. 628,008

3 Claims. (Cl. 265—30)

This case relates to weighing and counting scales.

The object of the invention is to provide an improved counting means and arrangement therefor in a scale.

Various other objects and advantages of the invention will be obvious from the following particular description of one form of mechanism embodying the invention or from an inspection of the accompanying drawing; and the invention also constitutes certain new and novel features of construction and combination of parts hereinafter set forth and claimed.

In the drawing:

Fig. 1 is a front view of a scale with the lower part in section, and

Fig. 2 is a section on line 2—2 of Fig. 1.

Referring to the drawing, in detail, 10 is a base housing containing the usual base levers, only the nose end of the long lever 12 being shown. The nose pivot 13 of this lever is connected by a draft rod 14 to the left hand end of an intermediate backweighting lever 15. A draft rod 16 is also connected to the nose pivot 13 of the long lever 12 and acts on the right hand arm of a backweighting lever 17 which is located below the other backweighting lever. Lever 15 is fulcrumed on a standard 18 and lever 17 is fulcrumed on a standard 19, both mounted on the base of the intermediate housing 20. On top of the housing 20 is mounted the column and head mechanism comprising the column 21 and head 22 enclosing the automatic counterbalancing and indicating mechanism. Connection is made from the backweighting lever 15 to intermediate lever 23 by means of a draft rod 24. Lever 23 through tape 25 actuates the pendulums 26 and indicator 27 which coacts with dial 28. Levers 15 and 17 carry poises 30 and 31, respectively, for adjusting the backweighting effect of each lever on the base system.

The outer ends of levers 15 and 17 are connected to dash pots 32 and 33. Lever 17 pivotally carries on its left hand arm a bearing 35 rigidly secured to the post 36 which carries at its upper end the unit counting pan 37. The post 36 passes through a hole 38 in the top of housing 20 and at its lower end is connected to a check link 39 pivoted to a rod 40 rigidly depending from the bottom of housing 20. The power multiplication between pan 37 and the platform (not shown) is 100 to 1 so that the counting ratio is 100 to 1 and one article in the pan will balance one hundred articles on the platform.

In operation to find the number of articles in a load on the main platform the following procedure is employed. The load when placed on the platform moves the pointer 27 away from the zero on dial 28. One or more of the same articles as on the platform are then placed in pan 37 to backweight the base lever system and return the indicator to zero position on dial 28. Since the ratio is 100 to 1, to find the number of articles on the platform when the indicator is at zero, it is then necessary to multiply the number of articles in the pan by 100.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. I therefore desire to be limited only as indicated by the scope of the following claims:

1. In a scale, a load operated base lever, a plurality of separate backweighting levers and independent separate connections from the base lever to each of the backweighting levers, a housing for substantially completely enclosing said backweighting levers, said housing having an opening, a counting pan and a connection between the pan and one of said backweighting levers passing through said opening.

2. In a scale, a load operated base lever, a backweighting lever connected thereto, a housing substantially completely enclosing the backweighting lever, a column and head mechanism mounted on top of said housing, the housing having an opening in the top, a counting pan, and a vertical movable depending connection between the pan and said backweighting lever passing through said housing opening, the head mechanism having an indicator moved by the load on the counting pan in a direction opposite to that in which it is moved by load on said base lever.

3. In a scale, a load operated base lever, a housing therefor, a backweighting lever above said housing, an intermediate housing for enclosing the backweighting lever, a connection between the base lever and said backweighting lever, an automatic counterbalancing and indicating mechanism mounted on the top of the intermediate housing including a column housing and dial housing, and a counting pan carried by the backweighting lever, an object in said pan moving the indicating mechanism in a direction opposite to which it is moved by said base lever.

WILLIAM N. GILBERT.
CLIFFORD B. HASKINS.